June 19, 1923.
A. E. AVERY
FISHING REEL
Filed Sept. 21, 1921
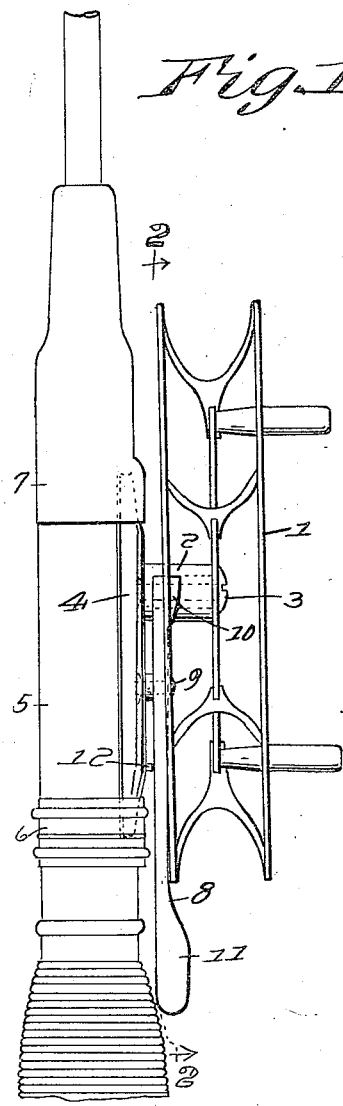
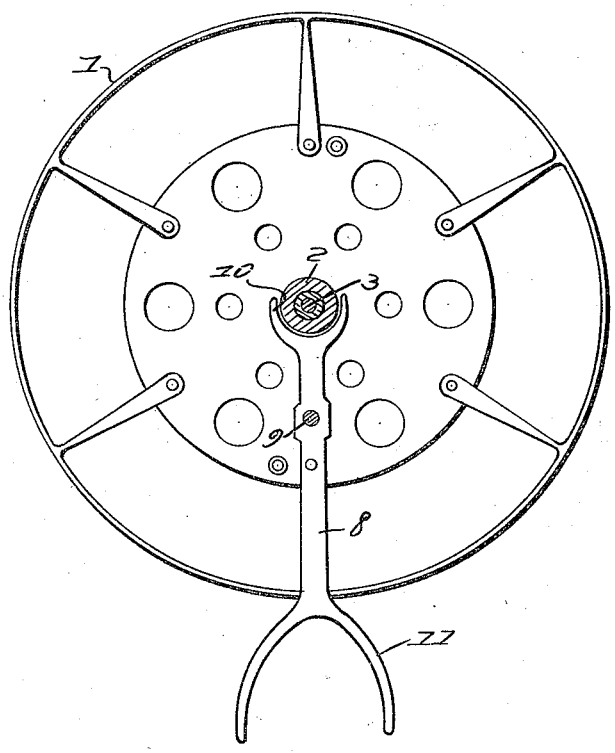

Patented June 19, 1923.

1,459,567

UNITED STATES PATENT OFFICE.

ARCH E. AVERY, OF MICHIGANTOWN, INDIANA.

FISHING REEL.

Application filed September 21, 1921. Serial No. 502,173.

*To all whom it may concern:*

Be it known that ARCH E. AVERY, a citizen of the United States of America, residing at Michigantown, in the county of Clinton and State of Indiana, has invented new and useful Improvements in Fishing Reels, of which the following is a specification.

The object of the invention is to provide means in conjunction with a fishing reel whereby the paying out of the line is well within control of the fisherman, so that it may be promptly arrested by the latter by the mere movement of his thumb. In the illustrated embodiment of the invention a specific structure is adhered to but to this the invention is not to be restricted. The right is reserved to make any changes or alterations not compatible in spirit with the annexed claims.

In the accompanying drawings:

Figure 1 is a view in side elevation of a portion of a fishing rod showing the reel with the improved brake or attachment secured thereto.

Figure 2 is a sectional view indicated by the line 2—2 of Figure 1.

The invention is adapted for use with any acceptable form of reel but is adapted to operate on the hub of the latter as clearly shown in the drawings in which the reel 1 is provided with the usual hub 2, the latter being rotatably mounted on a stud 3 secured to the base plate 4, the latter being mounted on the reel seat 5 of the fishing rod and secured in place by the usual clamping elements 6 and 7 carried by the rod. The brake consists of an arm 8 pivoted as indicated at 9 on the base plate 4 and provided forwardly with a yoke 10 straddling the hub and adapted to frictionally engage the latter upon rocking movement of the arm, the arm being provided rearwardly with a similar yoke 11 between the arms of which the thumb is normally disposed in the use of the invention. A pin 12 is mounted on the base plate and frictionally engages the arm 8 to preclude too free movement of the latter.

In the operation of the invention, when the line is being unreeled, the friction pin 12 holds the arm in such a position that the yoke 10 will stand clear of the hub 2. When it is desired to arrest the movement of the reel and thus stop paying out of the line, upward or downward movement of the yoke 11 by the mere movement of the thumb will bring one or the other of the arms of the yoke 10 into engagement with the periphery of the hub, thus stopping movement of the reel or retarding its turning as desired.

While the friction pin 12 will serve to maintain the brake out of contact with the hub when it is not desired to use the brake, this frictional engagement of the pin with the brake is insufficient to impose any material resistance to the operation of the brake by the thumb of the fisherman.

Having described the invention, what is claimed as new and useful is:—

1. The combination with a fishing reel having a hub, of a pivotally mounted arm formed at one end with a yoke straddling the hub and at the other end with a thumb seat by means of which the arm may be rocked to frictionally engage one or the other of the arms of the yoke with the hub.

2. The combination with a fishing reel having a hub, of a pivotally mounted lever formed at its opposite extremities with yokes of which one straddles the hub and the other constitutes a thumb seat, and a friction member engaging the arm to prevent too free movement of the latter.

In testimony whereof he affixes his signature.

ARCH E. AVERY.